United States Patent
Harvey

[15] 3,705,637
[45] Dec. 12, 1972

[54] SNOWMOBILE SUSPENSION SYSTEM
[72] Inventor: Charles V. Harvey, Route 3, Box 233, Forest Lake, Minn. 55025
[22] Filed: May 27, 1971
[21] Appl. No.: 147,411

[52] U.S. Cl.................180/5 R, 180/9.58, 305/27, 305/31
[51] Int. Cl. ..........................................B62m 27/02
[58] Field of Search..........180/5 R, 9.58; 305/27, 31

[56] References Cited

UNITED STATES PATENTS

| | | |
|---|---|---|
| 1,276,035 | 8/1918 | Crane ........................180/5 R |
| 3,483,936 | 12/1969 | Nilsson ......................180/5 R |
| 3,404,745 | 10/1968 | Smieja ......................180/5 R |

*Primary Examiner*—Richard J. Johnson
*Attorney*—Orrin M. Haugen

[57] ABSTRACT

A track suspension means for vehicles having an endless track drive and support surface, the vehicle having frame means with forward and rear mounting points. The track suspension means which is coupled to the vehicle at the mounting points includes longitudinally disposed flexible leaf spring means normally arranged convexly to the running surface, with the leaf spring means having an axis disposed generally parallel to the track axis, and being adapted to flex vertically. The leaf spring, which carries a plurality of supporting means such as bogie wheels for the track, is secured at its forward end to the vehicle frame at the forward mounting point. The endless track suspension means includes forwardly and rearwardly disposed sprockets inscribed within the endless track, and mounting means are provided for the sprockets including axle shafts. Track propelling means are coupled to the forwardly disposed sprockets, while track tensioning means and the rear of said leaf spring are operatively coupled to the rearwardly disposed sprockets. Pivot linkage means are provided for coupling the rear sprocket mounting means to the vehicle at the rear mounting point. The pivot linkage means includes rear support shaft means journaled for pivotal rotation generally concentrically with the common axis of said rear frame mounting points, a first torque arm coupled at one end to said rear support shaft means and with a floating pivot shaft journaled to the other end of the first torque arm. A second arm is provided having one end journaled to the floating pivot, and with the other end coupled to the rear sprocket mounting means, such as the rear axle shaft. Resilient spring bias means are coupled between the frame means and the rear support shaft means and normally urge the mounting shaft means for the rearwardly disposed sprockets such as the rear axle shaft in a direction toward the lower span of the endless track.

15 Claims, 10 Drawing Figures

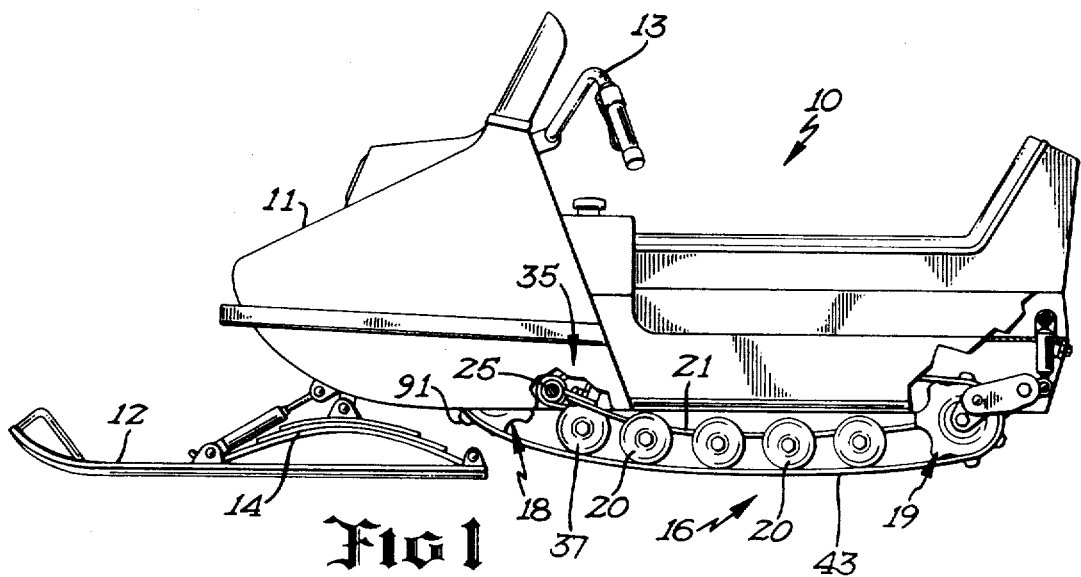
Fig 1
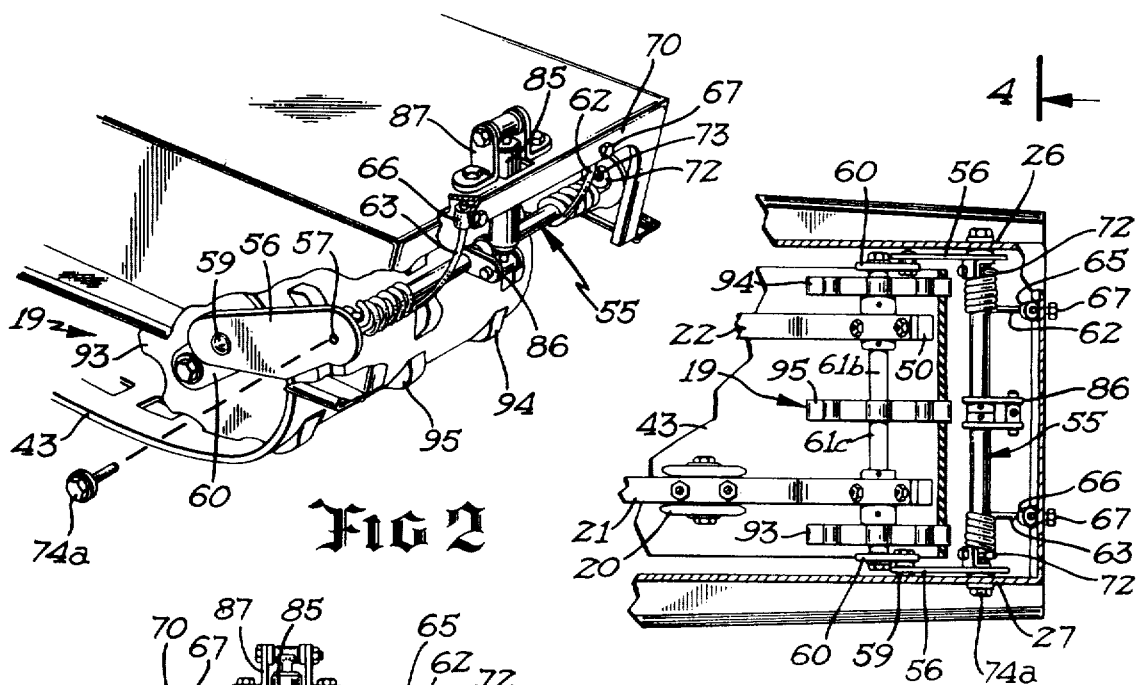
Fig 2
Fig 3
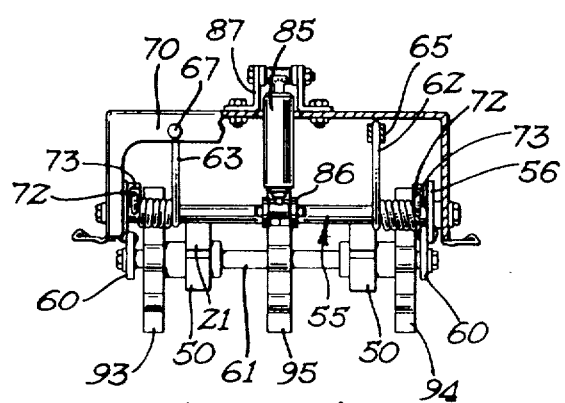
Fig 4
INVENTOR.
Charles V. Harvey
BY
Orrin M. Haugen
ATTORNEY

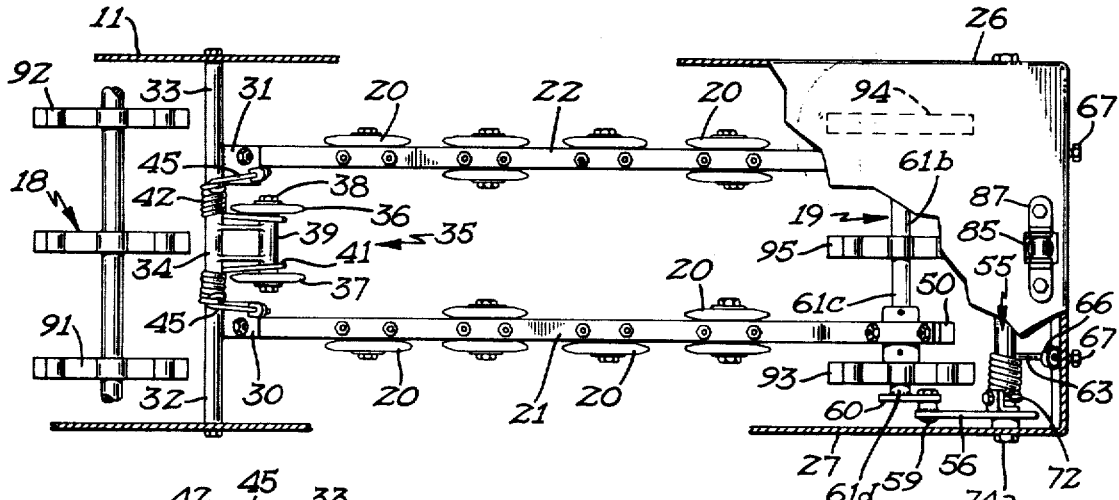
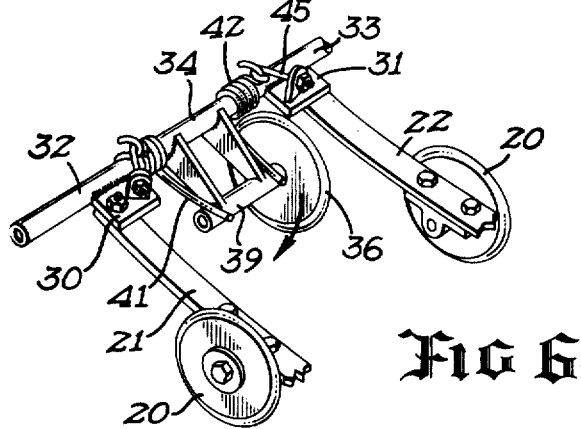
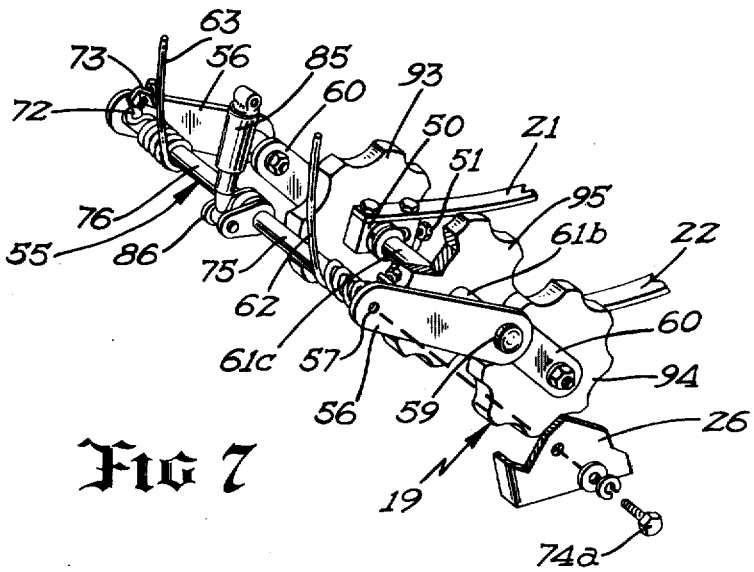

INVENTOR.
Charles V. Harvey
BY
Orrin M. Haugen
ATTORNEY

SNOWMOBILE SUSPENSION SYSTEM

CROSS-REFERENCE TO RELATED APPLICATION

The present invention is an improvement over my copending application Ser. No. 131,673, filed Apr. 6, 1971, entitled "SUSPENSION SYSTEM FOR SNOWMOBILES".

BACKGROUND OF THE INVENTION

The present invention relates generally to a track suspension means for vehicles utilizing endless track drive and support surfaces, and more specifically to track suspension means for self-propelled snowmobile structures. The track suspension means is capable of being adjusted to accommodate a given load, and accordingly to provide a smooth ride under a wide variety of operating conditions. In addition, the track support means provides for optimum contact between the drive surface and the running surface of the ground, inasmuch as the track surface is normally urged into contact with the running surface by resilient flexible leaf spring means.

The track suspension means of the present invention enables the structure to move smoothly over extremely rough terrain, and provides for optimum contact between the track and the running surface of the ground. These advantages are accomplished in the environment of an extremely rugged, durable, and easily serviced structure, the structure being readily adjustable to accommodate the magnitude of the vehicle load to the running conditions expected to be encountered.

SUMMARY OF THE INVENTION

Therefore, it is a primary object of the present invention to provide an improved track suspension means for vehicles having endless track drive and support surfaces, such as a self-propelled snowmobile, wherein the suspension is extremely rugged and durable, and capable of complying with the surface of extremely rugged and rough terrain.

It is yet a further object of the present invention to provide an improved track suspension means for snowmobile vehicles utilizing an endless track drive and support surface, wherein the suspension means is readily adjustable to accommodate the normal variations in load.

It is yet a further object of the present invention to provide an improved track suspension means for a snowmobile vehicle which is adjustable to load conditions, and which provides a base for the track which readily complies with the surface of the running terrain.

Other and further objects of the present invention will become apparent to those skilled in the art upon a study of the following specification, appended claims, and accompanying drawings.

BRIEF DESCRIPTION OF THE DRAWINGS

FIG. 1 is a side elevational view, partially broken away, of a snowmobile vehicle having the track suspension means of the present invention mounted thereon, with portions of the vehicle structure being broken away to illustrate details of the track suspension;

FIG. 2 is a detail perspective view, partially broken away, and on a slightly enlarged scale, illustrating the details of the rear portion of the track suspension means of the present invention;

FIG. 3 is a detail sectional view of that portion of the track suspension means illustrated in FIG. 2, this view being taken generally along a plane disposed beneath the upper portion of the tunnel of the snowmobile structure;

FIG. 4 is a vertical sectional view taken along the line and in the direction of the arrows 4—4 of FIG. 3;

FIG. 5 is a top plan view, on a slightly enlarged scale, of the track suspension means, this view being taken with the endless track removed from the structure;

FIG. 6 is a detail perspective view of the front mounting portion for the track suspension means, and illustrating the forward portion only of the leaf spring, with the remaining portions of the leaf spring being broken away;

FIG. 7 is a detail perspective view showing the rear portion of the track suspension means removed from its vehicle housing in order to illustrate details of this portion of the assembly with greater clarity;

DESCRIPTION OF THE PREFERRED EMBODIMENT

Figure 8:
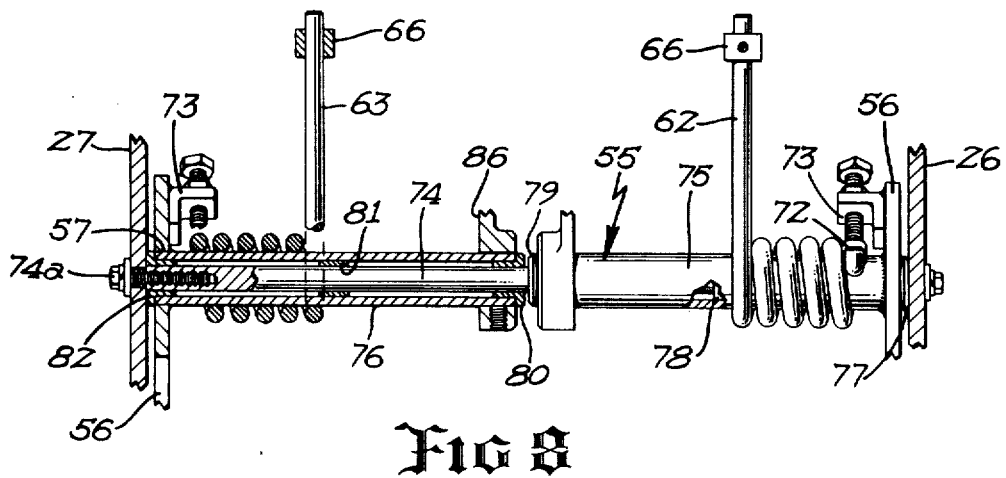
FIG. 8 is a detail elevational view of the rear support shaft means of the track suspension system.

With particular attention being directed to FIG. 1 of the drawings, the snowmobile vehicle generally designated 10 includes a frame structure and housing 11 supported upon a forward ski structure 12 which is steerable through the steering column 13, and coupled to the frame 11 through the mounting arrangement 14. This part of the structure is conventional and snowmobile vehicles having this arrangement of components are, of course, commercially available. The track suspension means, shown generally at 16, is secured to the frame 11 through detailed mounting features which will be described more fully hereinafter. The track suspension means 16 includes forwardly and rearwardly disposed sprocket assemblies 18 and 19, along with a plurality of boggie wheels such as the bogie wheels 20-20, each of the wheels being mounted on the leaf spring means 21 and 22. If desired, the bogie wheels may be coupled to the leaf spring by individual spring means. In order to couple the track suspension means 16 to the vehicle 11, longitudinally spaced forward and rear mounting points are provided, with the forward mounting point being along mounting shaft 25, and the rear mounting points being along the frame means at points 26 and 27, as best illustrated in FIGS. 2, 3 and 4. As is indicated, the rear mounting points have a common axis which is disposed generally transversely to the longitudinal axis of the endless track.

As is apparent in the illustration, particularly FIGS. 5 and 6, the leaf spring means 21 and 22 are longitudinally flexible, and have their axes disposed generally parallel to the axis of the track. These leaf springs are adapted to flex vertically about the spring axis so as to accommodate and comply with the nature of the surface of the running terrain. As is illustrated in FIG. 1, the leaf springs 21 and 22 are arranged to be generally convex to the lower span of the endless track as well as the running surface, thus providing and accommodating a smooth ride.

With continued attention being directed to the leaf spring means, it will be observed that these springs are coupled, at their forward ends, to a mounting bracket which is secured, through sleeve means, to shaft 25. With particular attention being directed to FIG. 6 of the drawings, it will be observed that the springs 21 and 22 are coupled to mounting ears or brackets 30 and 31 by conventional means, such as bolts or the like, these mounting brackets being, in turn, secured to the sleeves 32 and 33. A third sleeve 34 is disposed intermediate the inner ends of sleeves 32 and 33 for the purpose of accommodating a bias wheel arrangement shown generally at 35. As is apparent, this bias means 35 incorporates a pair of pressure exerting wheels 36 and 37, which are journaled on shaft 38, with shaft 38 being confined within sleeve housing 39, which in turn is coupled by brackets onto sleeve 34. A pair of helically wound spring members 41 and 42 are utilized to resiliently urge the wheels 36 and 37 downwardly against the lower span of the endless track, such as the lower span shown at 43 in FIG. 1. As is apparent from the drawings, the tension in springs 41 and 42 is adjustable by positioning of the "J" hooks, such as the "J" hook 45.

The individual bogie wheels 20-20 are secured by any suitable means to the extent of the leaf springs 21 and 22. These bogie wheels are conventional in nature, and are adapted to run against the inner surface of the lower span of the endless track, such as the lower span 43. Because of the inherent flexibility of the leaf springs 21 and 22, and their ability to flex vertically about the axis, a smooth ride is possible with the track complying to the surface of the running terrain.

The leaf spring means 21 and 22 are coupled at their rear ends to the support means for the rearwardly disposed sprockets 19. The details of this coupling are best shown in FIGS. 2, 3 and 5. It will be observed that the springs 21 and 22 are, in fact, coupled to the mounting means for the rearwardly disposed sprocket assembly 19, such as on the blocks 50-50 which provides a mounting support for adjustably shifting the mounting shaft of the rearwardly disposed sprocket assembly 19. The axial disposition of the shaft supporting the rearwardly disposed sprocket 19 is controlled by the position of the threaded bolt members 51-51, as is illustrated in FIG. 7.

Attention is now directed to FIGS. 3, 4 and 7 for a discussion of the details of mounting of the rear portion of the track suspension means to the vehicle. In this connection, the frame mounting points are shown at 26 and 27, with bushings or bearings being provided to provide for pivotal rotation of sleeve segments 75 and 76 upon shaft 74, shaft 74 receiving the mounting bolts so illustrated (see FIG. 8). With the bushings or bearings provided for receiving the mounting bolts 26 and 27, means are provided for pivotally supporting rear support shaft 55. The rear mounting arrangement is accomplished through first and second torque arms forming a pivot linkage means. With attention being directed to FIG. 2 of the drawings, a first torque arm is shown at 56, this torque arm being coupled at one end to the rear support shaft means 55, as at 57. The forward end of first torque arm 56 is provided with a floating pivot shaft 59 which is provided to form a journal element. A second torque arm 60 is provided, with one end of arm 60 being journaled to floating pivot shaft 59, with the other end of second arm 60 being coupled to the mounting shaft means 61 of rearwardly disposed sprocket assembly 19. The right-hand portion of the assembly is identical to that described in connection with torque arms and the like, and hence no detailed description need be given of that portion of the assembly.

In order to controlably bias the system so that the mounting shaft means for the rearwardly disposed sprockets 19 will be urged toward the lower span of the endless track, a pair of spring members 62 and 63 are provided, these springs being helically wound about rear support shaft means 55, as shown in FIGS. 2, 3, 4 and 8; and otherwise coupled to the frame of the structure through a pair of spring keepers 65 and 66. The details of this portion of the assembly are believed best illustrated in FIGS. 2 and 3. Adjustment bolts may be provided for springs 62 and 63, such as the adjustment bolt member 67. As is apparent in the structure, the spring keepers 65 and 66 are secured by means of welding, or the like, to the rear frame member 70, this providing a convenient means of attachment to the frame of the vehicle. As is indicated in FIG. 3, the opposite ends of springs 62 and 63 are formed into a hook or claw, such as is shown at 72, with the hook or claw being received in a clevis or ear formed integrally with the torque arm 56, such as is shown at 73 in FIG. 2.

Attention is now directed to FIG. 8 of the drawings wherein details of the rear support shaft means 55 are illustrated. In this view, rear support shaft means generally designated 55 comprises the stationary shaft 74 which is secured to the frame by means of bolts, such as the bolts 74a. Concentric with shaft 74 are split housing segments 75 and 76, segments 75 and 76 being mounted for concentric pivotal rotation about shaft 74. In order to accomplish ease of pivotal rotation, bushings or journal bearings 77, 78, and 79 are provided for segment 75, while bushings 80, 81, and 82 are provided for housing 76. Thus, with appropriate adjustment of the helically wound springs 62 and 63 upon clevis members or ears 73-73, independent resilient springing motion is available for the rear portion of the track supporting assembly.

Figure 9:
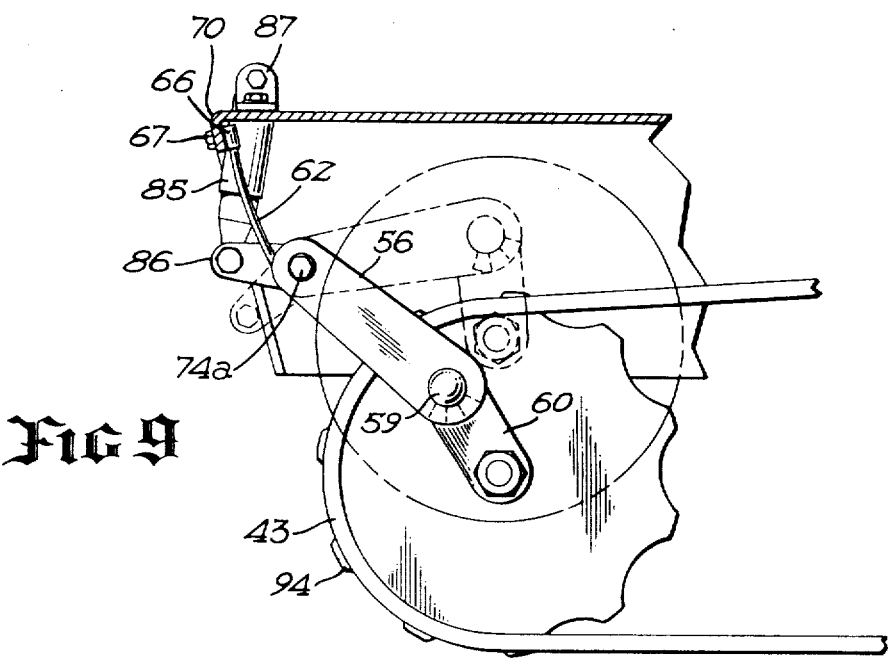
FIG. 9 is a side elevational view of the rear portion only of the track suspension means, an illustrating the limited motion available in the system, with the lower limit of motion of the components of the structure being shown in solid, and with the disposition in the upper limit of travel of these components being shown in phantom.

Attention is now directed to FIG. 9 of the drawings wherein the extent of travel of the housing segments 75 and 76 upon shaft 74 is illustrated. In this drawing, the bottom portion of the stroke of travel is illustrated in solid, while the upper limit of travel is shown in phantom. In this view, the articulation of the components of the assembly are clearly illustrated.

Attention is now re-directed to FIGS. 4 and 8 wherein the operation of the shock absorber structure is illustrated. In this connection, shock absorber structure 85 is shown, coupled between crank arm 86 and frame mounting bracket 87. As is illustrated, frame mounting bracket 87 is fast upon the frame of the assembly, while crank arm 86 is secured to opposite ends of housing segments 75 and 76. Thus, shock absorber 85 is coupled between the crank arm means 86 and the frame means for resisting shock motion between the rear sprocket mounting means and the frame means. Shock absorber 85 is of conventional construction, and is merely responsive or sensitive to changes in the distance between its opposed mounting ends.

Figure 10:
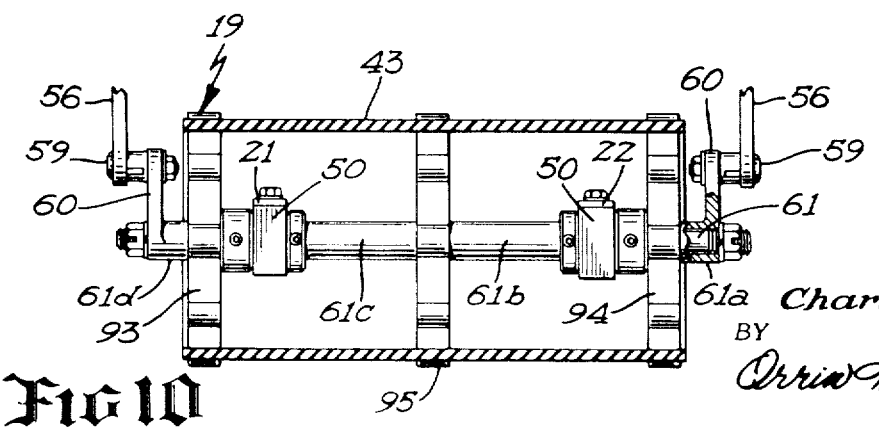
FIG. 10 is a vertical sectional view of the rear axle assembly and supporting structure for the rear track supporting idlers.

In FIG. 10, the details of the rear axle portion of the assembly are shown. In this view, the rear axle shaft 61 is shown confined within spacers or sleeves 61a, 61b, 61c, and 61d. The operation of this portion of the system is, of course, straightforward.

In actual operation, the user will initially adjust the assembly to receive the endless track, by appropriately setting bolt 51 within the confines of slotted member 50. Once having achieved proper adjustment here, the tension in the track may be controlled by appropriate tightening or relaxation of tension in springs 41 and 42, by adjustment of the "J" bolts such as the "J" bolt 45. Further adjustment of the track suspension system may be made at the rear portion of the assembly, such as in the adjustment of the tension of springs 62 and 63 by virtue of proper positioning of ears or clevis 73-73 relative to torque arms 56-56. At this stage, the unit is ready for operation with the firmness of the system (as well as the firmness of response), and the track tension being appropriately controlled. For heavier loads and duty, a tightening of the individual spring elements 62 and 63 will normally be required to avoid "bottoming" of the structure within the confines of the drive tunnel of the assembly. As is illustrated and apparent in the drawings, the entire track suspension system is confined within the conventional tunnel for the unit.

Also, as is conventional, energy is delivered from the engine of the vehicle to the forwardly disposed sprockets, including sprockets 91 and 92, from sprocket assembly 18, and thus the endless track is caused to move about these elements. The rear sprockets 93, 94 and 95 are, of course, idlers, with these sprockets being provided in the arrangement 19. The individual sprockets 91, 92, 93, 94, and 95 therefore define the elliptical configuration for the endless track, with the configuration and compliance of the lower span 43 being controlled by the disposition of the bogie wheels 20-20 along the leaf springs 21 and 22.

It will be appreciated that the system of the present invention is both rugged and durable, and adjustable to the requirements of the load and the terrain. These adjustments are accomplished readily and easily.

I claim:

1. Track suspension means for vehicles having endless track drive and support surfaces, and comprising:
   a. frame means for said vehicle, and track suspension means coupled thereto at longitudinally spaced forward and rear mounting points, with the endless track having a longitudinal axis, said rear mounting points having a common axis disposed generally transversely to the longitudinal axis of said endless track;
   b. said track suspension means including longitudinally flexible leaf spring means having an axis disposed generally parallel to the axis of the endless track and adapted to flex vertically about said spring axis, said leaf spring means being coupled at its forward end to said frame at said forward mounting point;
   c. a plurality of track running support means secured to said leaf spring means at spaced points along the longitudinal axis thereof;
   d. said track suspension means including forwardly and rearwardly disposed sprockets inscribed within said endless track to form upper and lower track spans, sprocket mounting means including mounting shaft means for said sprockets, track propelling means and track tensioning means coupled to said forwardly and rearwardly disposed sprockets, said leaf spring means being generally convex to the lower span of said endless track and being coupled at its rearward end to the mounting means for said rearwardly disposed sprockets;
   e. pivot linkage means coupling said rear sprocket mounting means to said rear frame mounting point, said pivot linkage means including rear support shaft means journaled for pivotal rotation generally concentrically with the common axis of said rear frame mounting points, a first torque arm coupled at one end to said rear support shaft means and with a floating pivot shaft journaled to the other end of said arm, a second torque means having one end journaled to said floating pivot shaft and with the other end thereof coupled to the mounting shaft means for said rearwardly disposed sprockets; and
   f. resilient spring bias means coupled between said frame means and said rear support shaft means and normally urging said rear support shaft means about said rear frame mounting points in an arcuate direction such that the forward end of said first torque arm is biased toward the lower span of said endless track.

2. The track suspension means as defined in claim 1 being particularly characterized in that said rear support shaft means includes a central shaft extending between opposed rear frame mounting points, and a housing is arranged about the outer diameter of said central shaft, said housing being journaled for pivotal rotation about said central shaft.

3. The track suspension means as defined in claim 2 being particularly characterized in that said housing comprises a pair of segments, each extending over substantially one-half the length of said central shaft.

4. The track suspension means as defined in claim 1 being particularly characterized in that crank arm means are provided and secured to said rear support shaft means for rotation with said rear support shaft means in response to arcuate motion of said first torque arms, and shock absorber means are provided and coupled between said crank arm means and said frame means for resisting shock motion between said rear sprocket mounting means and said frame means.

5. The track suspension means as defined in claim 1 being particularly characterized in that means are provided for adjustably coupling said resilient spring bias means between said frame means and said rear support shaft means for controlably varying the magnitude of torque normally applied to said rear support shaft means by said resilient spring bias means in resistance to arcuate motion of said first torque arms responsive to an increase in load on said vehicle.

6. The track suspension means as defined in claim 1 being particularly characterized in that said mounting shaft means includes front and rear axle shaft means for said respective forwardly and rearwardly disposed sprockets, and first sleeve means are provided about said rear axle shaft means and are coupled to the rear of said flexible leaf spring means.

7. The track suspension means as defined in claim 6 being particularly characterized in that adjustment means are coupled to said first sleeve means to adjustably control the normal distance between said front and rear axle shaft means.

8. The track suspension means as defined in claim 1 being particularly characterized in that said flexible leaf spring means are bowed convex to the said lower track span.

9. The track suspension means as defined in claim 1 being particularly characterized in that means are provided in association with said track tensioning means for adjustably shifting the mounting shaft means for said rearwardly disposed sprocket relative to and along the axis of said endless track.

10. The track suspension means as defined in claim 1 being particularly characterized in that track tensioning means includes idler wheels disposed adjacent said forwardly disposed sprockets, with said idler wheels being normally urged toward and against said lower track span.

11. The track suspension means as defined in claim 1 being particularly characterized in that said clevis means are secured to said rear support shaft means for adjustably coupling said resilient spring bias means between said rear support shaft means and said frame means.

12. The track suspension means as defined in claim 1 being particularly characterized in that said torque arm of said pivot linkage means is normally biased to extend downwardly from said rear frame mounting point.

13. The track suspension means as defined in claim 1 being particularly characterized in that said track running support means are bogie wheels.

14. The track suspension means as defined in claim 1 being particularly characterized in that said track propelling means are coupled to said forwardly disposed sprockets.

15. The track suspension means as defined in claim 1 being particularly characterized in that slot means are formed in said first sleeve means for adjustably positioning the mounting shaft means for said rearwardly disposed sprockets.

* * * * *